United States Patent [19]
Johnston

[11] Patent Number: 5,952,733
[45] Date of Patent: Sep. 14, 1999

[54] POWER DISTRIBUTION SYSTEM FOR ELECTRONIC DEVICES

[75] Inventor: Geron Mark Johnston, Aloha, Oreg.

[73] Assignee: Intel Corporation, Santa Clara, Calif.

[21] Appl. No.: 08/985,378

[22] Filed: Dec. 5, 1997

[51] Int. Cl.[6] .................................................. H02J 3/38
[52] U.S. Cl. .............................. 307/44; 307/24; 307/31; 363/71
[58] Field of Search .................... 363/71, 21; 307/44, 307/43, 24, 31, 38

[56] References Cited

U.S. PATENT DOCUMENTS

| | | | |
|---|---|---|---|
| 4,383,183 | 5/1983 | Schlenk et al. | 307/43 |
| 4,677,535 | 6/1987 | Kawabata et al. | 363/65 |
| 5,191,519 | 3/1993 | Kawakami | 363/71 |
| 5,212,630 | 5/1993 | Yamamoto | 363/71 |
| 5,262,935 | 11/1993 | Shirahama | 363/71 |
| 5,428,524 | 6/1995 | Massie . | |
| 5,598,041 | 1/1997 | Willis | 307/43 |
| 5,657,217 | 8/1997 | Watanabe et al. | 363/71 |
| 5,764,047 | 6/1998 | Massie . | |
| 5,777,461 | 7/1998 | Massie et al. | 323/282 |

OTHER PUBLICATIONS

"Programmable Precision References," TL431, A, B Series: Motorola, Inc. (1987).
"Current–Fed PWM Controllers," MIC3832/3833: Micrel, pp. 4–135–4–144 (1997).

*Primary Examiner*—Jeffrey Gaffin
*Assistant Examiner*—Ed Garlepp
*Attorney, Agent, or Firm*—Kenyon & Kenyon

[57] ABSTRACT

A power distribution system in which a plurality of power supplies generate power of one or more regulated voltages, each voltage being received by regulator circuit that compares the regulated voltage against a predetermined reference voltage level and generates a digital control signal therefrom. Each power supply increases the regulated voltage when the respective control signal indicates that the regulated voltage is less than an optimum level.

6 Claims, 6 Drawing Sheets

5,952,733

POWER DISTRIBUTION SYSTEM FOR ELECTRONIC DEVICES

BACKGROUND OF THE INVENTION

1. FIELD OF THE INVENTION

The present invention relates to a control system for power supplies in electronic devices and, more particularly, to a digital control system for such power supplies.

2. RELATED ART

Many electronic devices include power supplies that provide an operating voltage to components contained within. Because operating voltages outside of specified limits cause aberrational behavior in solid state components, the power supplies typically regulate the voltage levels with precision.

It is a goal of power distribution systems to provide redundancy in the event of a power supply failure, and a precise division of current-share among power supplies to extend the useful life of each. Many electronic devices, such as PC server systems, require a constant uninterruptible supply of power. These devices are sometimes referred to as "fault-tolerant" or "parallel-redundant" systems. Accordingly, such conventional power supply systems in such devices include two or more power supplies to provide redundancy, a docking backplane to mate with such supplies, and point-of-use planes where the power is dissipated. Typically, each power supply generates power at one or more voltage levels using AC/DC/DC converters. Although the power supplies are identical, one becomes a master power supply and the others become slave power supplies when operated in a current-share mode. Circuitry within the power supply regulates the voltage being output by the power supply over an analog "sense" line.

Disadvantages of the master-slave scheme include:

1. The master supply bears a disproportionate load relative to the slave supply. During power up, the inequitable division of labor is particularly acute: The master supply carries the entire system load initially on power up, after which the slave powers up and shares the load. However, the slave does not bear a full share of the load. The master-slave arrangement shortens the useful life of the master power supply. The charging of the system capacitance creates critical stress on the master supply.

2. The master supply must be able to carry the full load of the electronic device at power up. The slave supply carries no load at power up. As the power requirements of electronic devices have increased, this increases requirements of the master supply. The master-slave scenario increases the cost of the power supplies.

3. The power supplies must be designed to account for periods when the electronic device draws very little power. Without such a design, a low power draw by the device can cause the master and slave supplies to shut themselves off. Thus, power supplies must include a design that works around this special case where the device draws very little load. The design around increases the complexity of the power supplies, increases their costs and adds reliability issues to the supplies.

4. Prior art power supplies are serially redundant which increases the minimum number of required components. "Serial redundancy" occurs from a cascaded series of control circuits: A first control circuit drives a second control circuit that, in turn, drives another control circuit. Typically, each control circuit may have approximately fifteen components. Serial redundancy drives up manufacturing costs and causes reliability issues.

5. Prior art power supplies use bulk capacitors repeatedly within the system prior to the point-of-use plane. The repeated presence of the capacitors cause undesirable effects upon output transient response, overall loop bandwidth, component cost, and reliability.

There is a need in the art for a power conversion and distribution scheme for electronic systems that: minimizes manufacturing complexity, cost, and component count, reduces operating stresses, enables re-use of former power supply designs, eliminates minimum load requirements, encourages simplicity instead of serially-redundancy, and allows marked gains in overall system performance. Further, there is a need in the art for a power distribution system that provides ease in fulfilling the system specifications as required by the electronic device in its realm of use.

SUMMARY OF THE INVENTION

Embodiments of the present invention provide a control system for a plurality of power supplies having controllable regulated voltages. A regulator circuit receives the regulated voltage and a reference voltage as inputs. It generates an output representative of the deviation of the regulated voltage from the reference voltage. The output is coupled to each of the plurality of power supplies as a control input.

DETAILED DESCRIPTION

Figure 1:
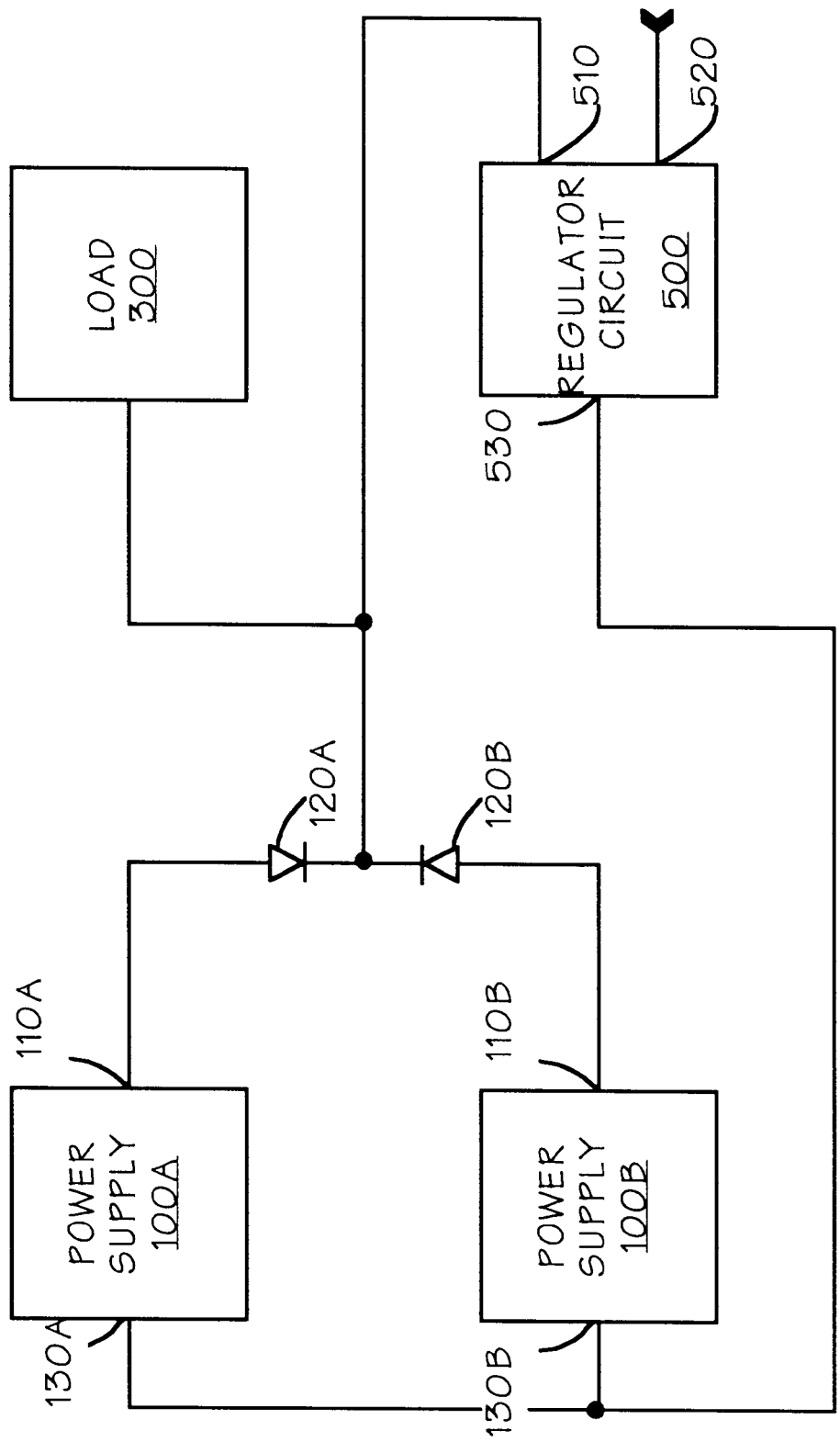
FIG. 1 is a block diagram illustrating a first embodiment of a redundant power distribution system of the present invention.

Turning now to FIG. 1, there is illustrated an embodiment of a power control system of the present invention. A plurality of power supplies each generate power at the same regulated voltage. The regulated voltages are output from the power supplies at terminals 110A and 110B respectively. Output terminals 110A and 110B may be merged via isolating diodes 120A and 120B as are shown and input to a load 300. Although only two power supplies are shown in FIG. 1, as many power supplies may be provided as are necessary to support the load 300.

The present invention provides a regulator circuit 500 for maintaining the regulated voltage at a predetermined level. The regulator circuit 500 tests the regulated voltage against an internally generated reference voltage. The regulator circuit 500 accepts the regulated voltage at terminal 510 and, optionally, accepts a bias voltage at terminal 520 to generate the reference voltage.

The regulator circuit 500 generates a digital control signal representative of the test and feeds the digital control signal back to each of the power supplies. The digital control signal is output from the regulator circuit 500 at terminal 530.

Alternatively, the regulator circuit 500 may generate two bi-phase digital control signals and feeds each back to one of the power supplies (not shown). The power supplies 100A and 100B receive the digital control signal(s) at terminals 130A and 130B respectively and, in response, modulate the level of the regulated voltages.

Figure 2:
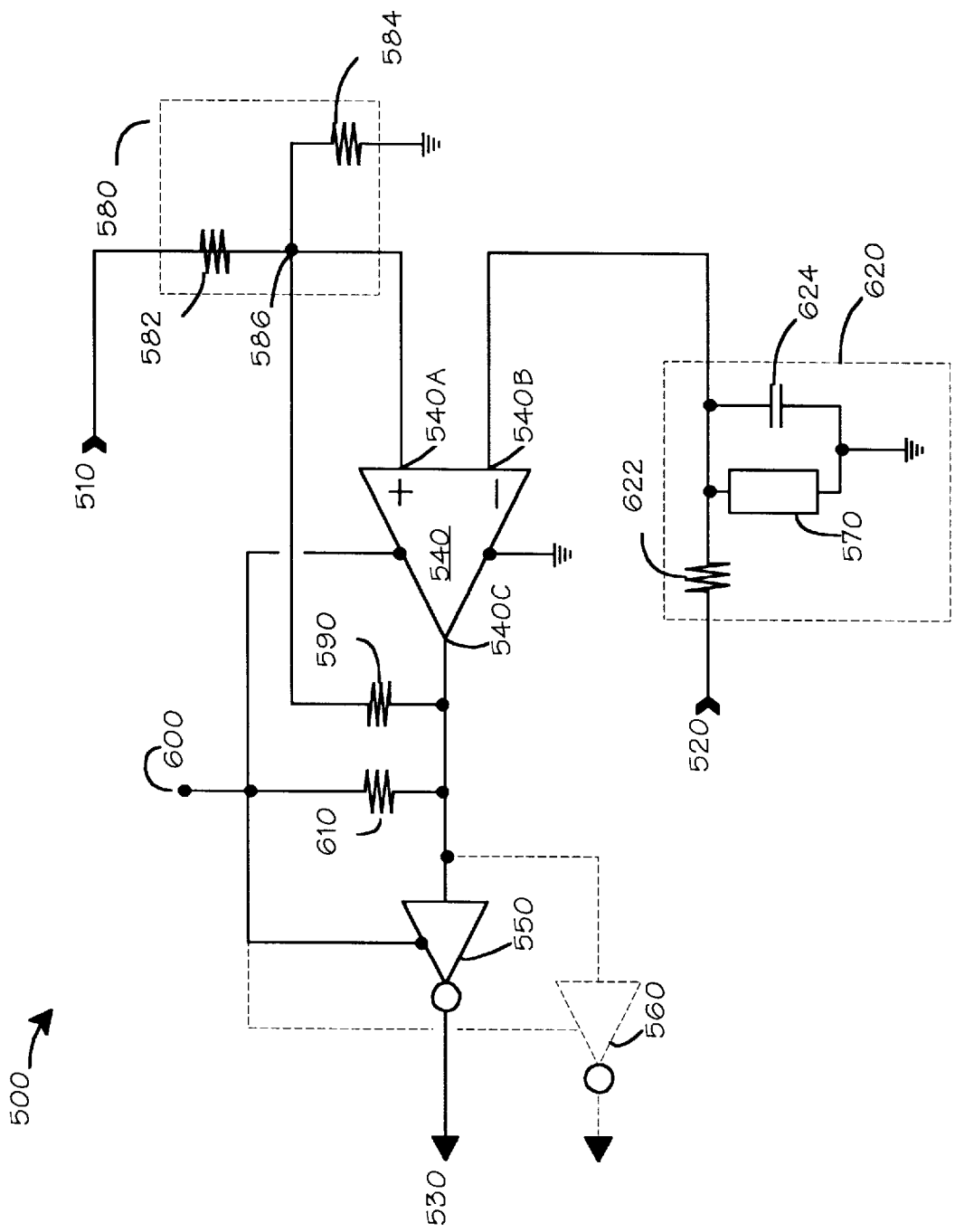
FIG. 2 is a circuit diagram illustrating a first embodiment of a regulator circuit.

FIG. 2 illustrates a first embodiment of a regulator circuit 500. The regulator circuit 500 includes a digital comparator 540 that compares the regulated voltage against the reference voltage. The regulated voltage from terminal 510 is coupled through a voltage divider 580 to the digital comparator 540 at a first input terminal 540A. The internally generated reference voltage is input to the digital comparator 540 at a second input terminal 540B. A binary output 540C of the digital comparator 540 represents a difference between the regulated voltage and the reference voltage. The comparator output may be inverted by one or more inverting buffers 550, 560 to generate the digital control signals.

The reference voltage is generated by a reference circuit 620, described below, which includes a reference device 570. The reference device 570 may be a programmable reference device, such as a TL431 series integrated circuit commercially available from Motorola Semiconductor of Phoenix, Arizona. Alternately, the reference device 570 may be a precision avalanche diode or a microcontroller.

Depending upon the voltage levels of the regulated voltage and the reference voltage, it may be preferable to divide down the regulated voltage before it is input to the digital comparator 540. For example, the desired value of the regulated voltage may be 12 V, a voltage common to ordinary electronic devices. The reference device may generate a 5 V reference voltage. In such a case, it is desirable to divide the regulated voltage down in such a manner that, when the regulated voltage meets the ideal 12 V level, the voltage at the first input terminal 540A is 5 V. In this embodiment, the regulator circuit 500 includes a voltage divider network 580 interconnecting input terminal 510 to the comparator input 540A. Resistors 582 and 584 of the voltage divider network 580 provide the required voltage division at node 586.

The digital comparator 540 generates a digital signal based on the voltages at the first and second input terminals. When the regulated voltage is lower than its desired level, the comparator 540 outputs a logical "0." Otherwise, the comparator 540 outputs a logical "1." The comparator output 540C is inverted and output from the regulated circuit 500 at terminal 530. One or more inverter buffers 550, 560 may be used, depending upon how much redundancy is desired in a particular design. When plural inverter buffers are used, a failure of any one inverter buffer does not disable all power supplies.

For stability, a hysteresis resistor 530 is provided interconnecting the comparator input terminal 540A to the comparator output 540C.

The architecture of the regulator circuit 500 provides certain advantages during power up of the electronic device. On power up, the first input to the regulator circuit 500 is a standby regulated voltage at terminal 600. The standby regulated voltage powers the digital comparator 540 and the inverter buffers 550, 560. It also pulls up the comparator output 540C via a pull up resistor 610. Under the influence of the pull up resistor 610, a logical "1" is input to the inverter buffers 550, 560, disabling stages of the power supplies that generate the regulated voltage (described herein in connection with FIG. 3).

The reference device 570 in circuit 620 accepts the bias voltage, received externally at terminal 520. The bias voltage is the second time related input to appear on power up. The reference device 570 is a member of a three element reference network 620 that limits the rate at which the reference device 570 rises to the reference voltage. During power up, current from the bias voltage source rushes through a resistor 622 and charges capacitor 624. The voltage of the reference device 570 rises with the charge rate of the capacitor 624. Eventually, the capacitor 624 becomes fully charged and the reference device 570 reaches the reference voltage level. The value of resistor 622 is determined by the bias current requirement of the reference device 570. Similarly, the minimum value of the capacitor 624 is determined by the minimum desirable turn-on slew rate of the power supply outputs 110A, 110B.

As noted, the comparator output 540C is inverted and output from the regulator circuit 500 as a digital control signal. The digital control signal is fed to each of the power supplies 100A and 100B. The power supplies 100A and 100B each contain control circuitry that regulates the level of the regulated voltage output from the power supply.

Figure 3:
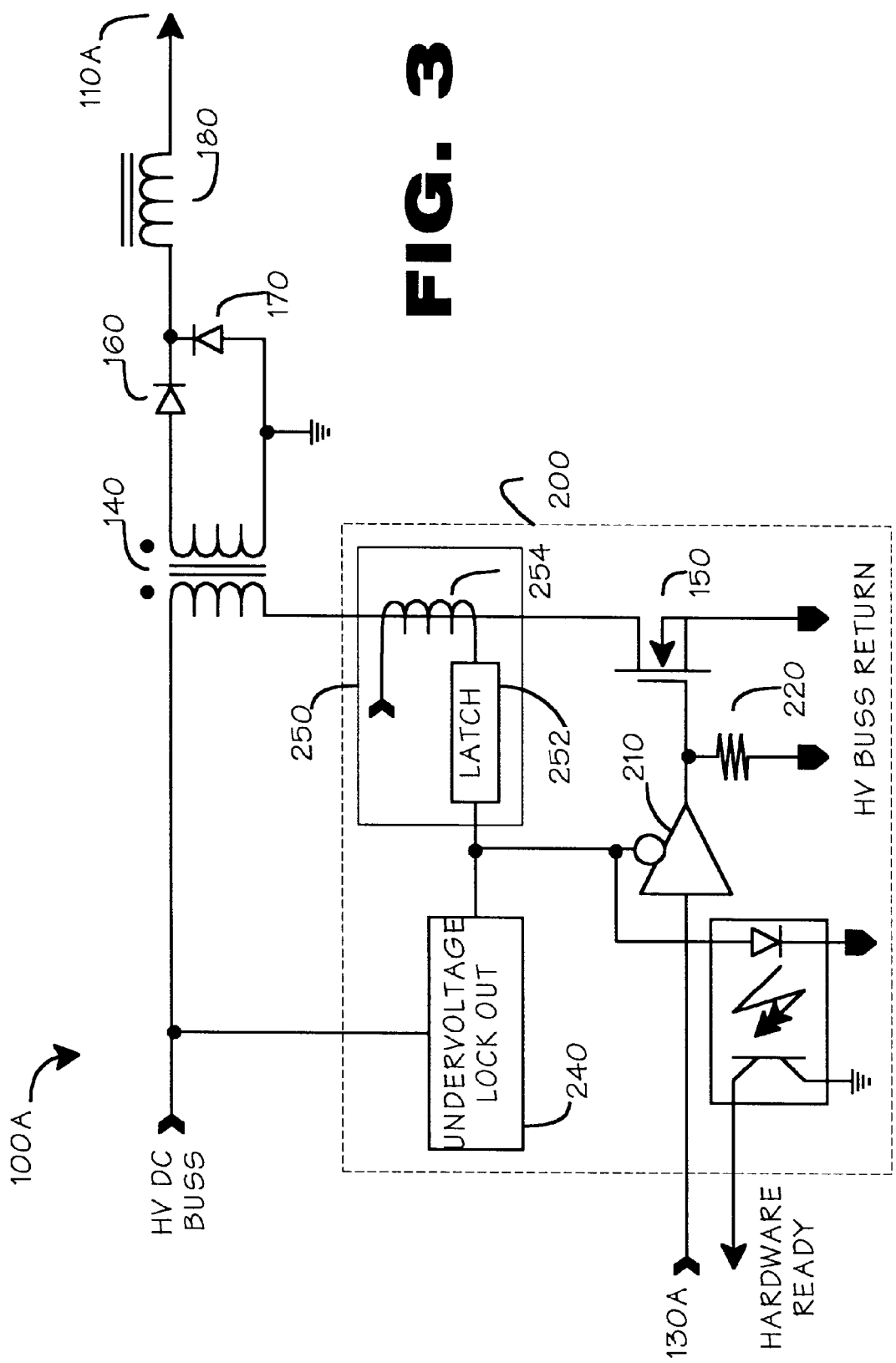
FIG. 3 illustrates an embodiment of a power converter within a power supply.

FIG. 3 illustrates an embodiment of power supply 100A as implemented in a forward converter topology. Power supply 100B is similar to power supply 100A. As is known, power supplies may be implemented in a variety of topologies, including flyback, half-bridge, cuk (boost-buck inverting and transformer based), full bridge and push-pull topologies. The principles of the present invention apply uniformly to each of these topologies.

Power from a DC source, such as a conventional 380 V HV DC BUSS, is input to the primary-side winding of a transformer 140. The output of the primary-side winding is coupled through a FET transistor 150 to a HV BUSS RETURN. The transformer 140 possesses a turn ratio that reflects a desired conversion from the level of the DC source to the ideal level of the regulated voltage in light of the anticipated duty factor of the transformer 140. For example, in the forward topology shown in FIG. 3 and using a typical duty factor of 33%, transformer 140 converts a 380 V source to 5 V if it possesses a turn ratio of 25:1

$$\left(\frac{380\,V * 33\%}{5\,V} = 25\right).$$

The digital control signal from the regulator circuit 500 is input to the control circuit 200 at terminal 130A. It propagates through a buffer 210 to an input of the transistor 150. Thus, depending upon the state of the digital control signal, the transistor 150 is either conductive or non conductive. The switching of the transistor 150 selectively permits or prevents current from flowing through the transformer 140 arid, thus, affects the level of the regulated power output from the power supply 100A. The input of transistor 150 is subject to the effects of a pull down resistor 220 to prevent the input from "floating."

A secondary side of transformer 140 is coupled to anodes of two diodes 160, 170. Cathodes of the two diodes 160, 170 connect to each other and to an input of an averaging inductor 180. Diode 160 rectifies the forward current that is delivered from transformer 140 when transistor 150 is switched on. Diode 170 provides a current path to inductor 180 when the inductor 180 releases energy from the power supply to the load 300 through terminal 110A. Additionally, inductor 180 and some parasitic inductance of distribution wiring subjects the regulated voltage to be subject to an averaging of the switching action of transistor 150.

The control circuit 200 may possess an under voltage lockout circuit 240 ("UVLO") that monitors the status of the high voltage DC BUSS. In the case of a power failure, the level of the high voltage power source will fall below tolerable limits, causing stress to the power supply. If the UVLO 240 senses the drop in voltage, it disables buffer 210 and shuts down the power supply 100A.

Also, each power supply 100 may be provided with a current limiting circuit 250. If current flowing through the primary-side of the transformer 140 exceeds a high safety threshold, the current limiting circuit 250 shuts down the power supply 100A. This feature sometimes is referred to in the industry as "over current protection" ("OCP"). It protects the power supply 100A against damage. The OCP circuit 250 includes a sensing element 254 in combination with a latch 252. If current through the transformer 140 reaches the safety threshold, sufficient current will flow through sensing element 254 and activate latch 252. Latch 252 disables the buffer 210 and shuts down the power supply 100A. Optionally, the current limiting circuit 250 may accommodate a reset signal or a time-out circuit to restart the power supply 100A after an OCP fault. If the fault was not cured, however, an attempt to reset the power supply 100A will lead to another shut down.

Outputs from the UVLO circuit 240 and OCP circuit 250 may generate a single "hardware ready" signal for the respective stage of the power supply 100A. The outputs are merged and input to an isolation circuit 260, such as an optocoupler, that generates the hardware ready signal.

Figure 4:
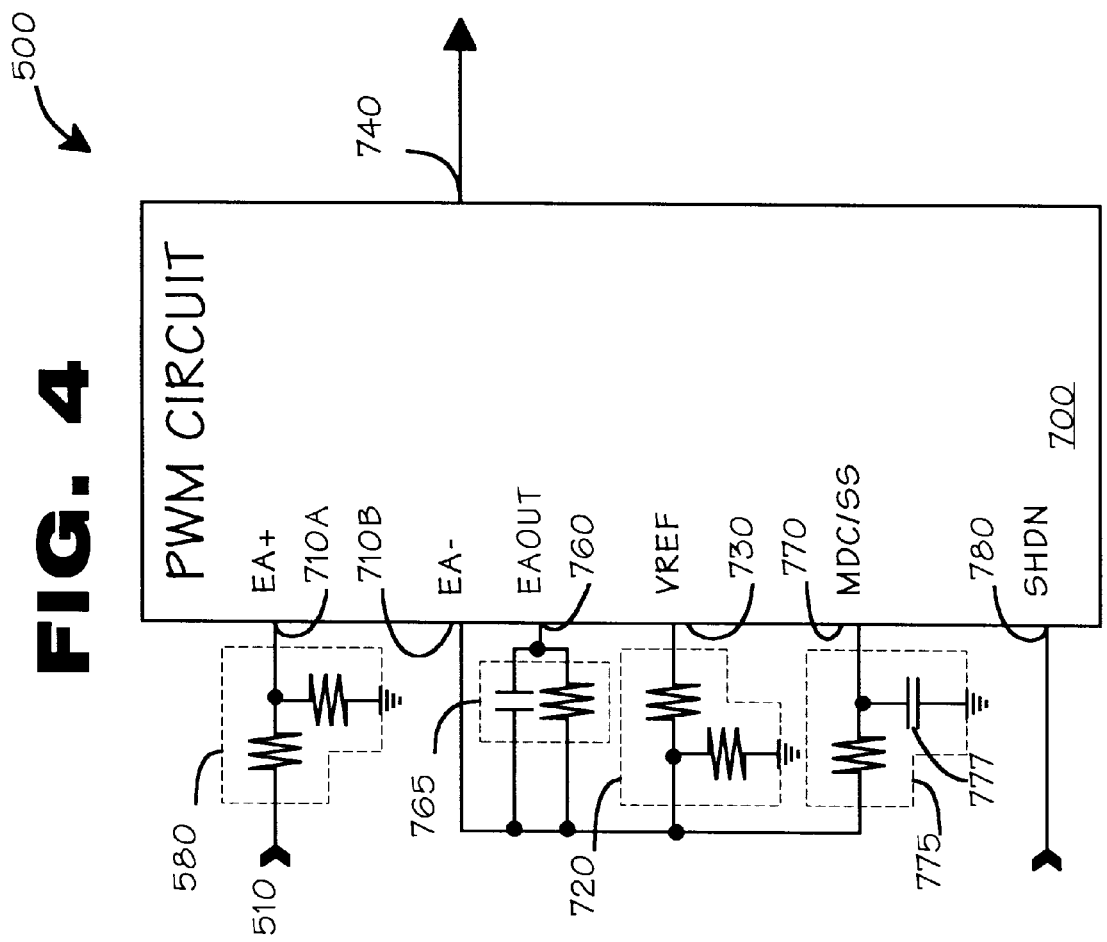
FIG. 4 is a circuit diagram illustrating a second embodiment of a regulator circuit.

A second embodiment of the regulator circuit 500 is shown in FIG. 4. The regulator circuit 500 may be provided with a pulse width modulator ("PWM") integrated circuit 700 to compare the regulated voltage with a reference voltage and output a digital control signal as a result. The regulated voltage is input to the circuit at terminal 510 and may be input to a first input terminal 710A of the PWM circuit 700 either directly or after being divided down by a voltage divider circuit 580. The reference voltage 730 is generated by the PWM circuit 700 itself and output from the circuit at terminal 730. The PWM circuit 700 generates a digital output at an output terminal 740 that represents the difference between the input voltages.

Voltage divider networks 580, 720 may be provided interconnected to either the first or second input terminals 710A, 710B depending upon the magnitude of the regulated voltage and the reference voltage. If the ideal regulated voltage is greater than the reference voltage, voltage divider 580 divides down the regulated voltage to the level of the reference voltage before inputting it to terminal 710A. For example, the internally generated reference voltage is typically 5 V. If the regulated voltage were at 12 V, voltage divider 580 divides down the regulated voltage input at terminal 710A to 5 V. Voltage divider 720 is omitted.

Conversely, if the desired regulated voltage is less than the reference voltage 730, then the regulator circuit 500 provides a voltage divider 720 divide the reference voltage down to the level of the desired regulated voltage. For example, if the regulated voltage were at 1.5 V and the reference voltage were at 5 V, voltage divider 720 divides the reference voltage down to 1.5 V before inputting it to terminal 710B. Voltage divider 580 is then omitted from the regulated voltage input 510.

PWM circuits 700 typically include a comparator (not shown) that compares the voltages input at the first and second input terminals 710A, 710B. The PWM circuit 700 also typically provides an output 760 from the comparator. The output 760 is coupled to the second input terminal 710B through an RC stabilization network 765 to stabilize operation of the PWM circuit 700.

The PWM circuit 700 may provide a soft start input 770 which is coupled to the reference voltage 730 through another RC network 775. The charging of capacitor 777 in the RC circuit 775 provides a gradual rise time of voltage at the power output 510 during an initial power up of the device.

Also, the PWM circuit 700 may be provided with a shutdown input 780 to disable the circuit 700. The input 780 is coupled to a power on signal as described below.

The PWM circuit 700 may be a conventional integrated circuit, such as the MIC3832/3833 PWM controller commercially available from Micrel. If the Micrel integrated circuit were used, the digital control signals are generated by one of the push-pull outputs Q or $\overline{Q}$. The regulated voltage is input the PWM controller at the EA+pin. The reference voltage is output from the PWM controller at the VREF pin and input to the second input terminal 710B at the EA-pin. Further, the soft start input 770 corresponds to the MDC/SS pin, the shutdown input 780 corresponds to the SHDN pin and the comparator output 760 corresponds to the EAOUT pin.

Embodiments of the digital control system of the present invention provide for digital control of a regulated voltage generated by multiple power supplies. Based on the state of the control signal, the multiple power supplies operate in unison to control the level of the regulated voltage. Thus, the power supplies share an equal amount of the load during start up and during steady state operation.

Figure 5:
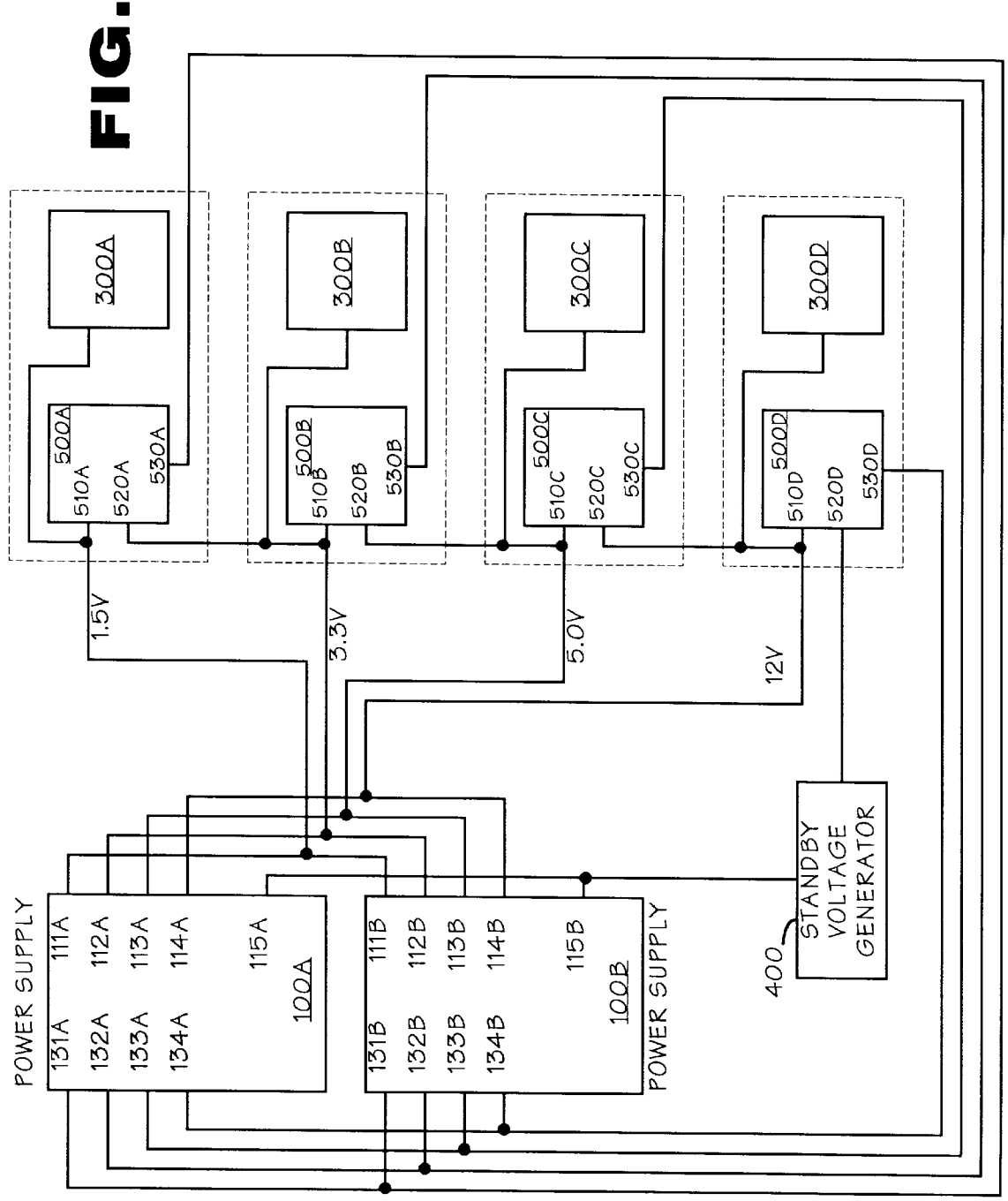
FIG. 5 is a block diagram illustrating a second embodiment of a redundant power distribution system of the present invention.

The principles of the present invention may be adapted to a power distribution system wherein the power supplies generate a plurality of regulated voltages. Such a system is shown in FIG. 5. Power supplies 100A and 100B in the illustrated embodiment generate power at four regulated voltages: 1.5 V, 3.3 V, 5.0 V and 12 V. These voltage levels are typical levels used within common electronic devices. Other voltages may be used consistent with the principles of the present invention. The regulated voltages are output from power supply 100A at terminals 111A–114A and from power supply 100B at terminals 111B–114B. The power supplies 100A, 100B contain power converters and control circuits (not shown) associated with each regulated voltage constructed in accordance with the teachings of FIG. 3. The regulated voltages power associated loads 300A–D.

The system provides regulator circuits 500A–D associated with each of the regulated voltages. The regulated voltages output by one power supply 100A are merged by optional isolating devices (not shown) with the corresponding regulated voltages from the other power supplies 100B and input to the regulator circuits 510A–D respectively at terminals 510A–D. Each regulator circuit 500A–500D tests its associated regulated voltage against a reference voltage and generates a digital control signal at terminals 530A–530D representative of the comparison. The digital control signal is coupled to the control circuitry associated with the regulated voltage in each of the power supplies 100A, 100B. With one exception, the regulator circuits 500A–500D are constructed identically to each other in accordance with the teachings of FIGS. 2 or 4.

As shown in FIG. 5, with one exception, the regulator circuits receive a bias voltage from a regulated voltage of another regulator circuit. Thus, the 1.5 V regulator circuit 500A receives the 3.3 V regulated voltage as its bias voltage at terminal 520A. The 3.3 V regulator circuit 500B receives the 5.0 V regulated voltage as its bias voltage at terminal 520B. The one exception is found in the 12 V regulator circuit 500D. The bias voltage for the 12 V regulator circuit 500D is the standby regulated voltage, generated by a standby regulated voltage generator circuit 400. The power supplies 100A, 100B generate a standby unregulated voltage output at terminals 115A and 115B. The standby unregulated voltage is used by the standby regulated voltage generator 400 to generate the standby regulated voltage.

By supplying the bias voltage of one regulator circuit to the regulated voltage input of another regulator circuit, this embodiment of the present invention may provide an order of operations on start up. When the power system is first energized, the power supplies 100A, 100B first energize the standby regulated voltage generator circuit 400. It generates the standby regulated voltage which is used as the bias voltage for one of the regulator circuits (circuit 500D in the example of FIG. 5). As noted above with respect to FIG. 2, the rise of the bias voltage regulates the rise of the associated regulated voltage. In practice, the regulated voltage will be delayed from the bias voltage by a short duration. Thus, by supplying the regulated voltage of one regulator circuit to the bias voltage input of another regulator circuit, the system orders the first regulated voltage for power up before the second regulated voltage. This order of operation reduces stress on the power supplies. In the example of FIG. 5, the regulated voltages power up in the following order: 12 V, 5.0 V, 3.3 V and 1.5 V; of course, other orders may be imposed as desired.

Figure 6:
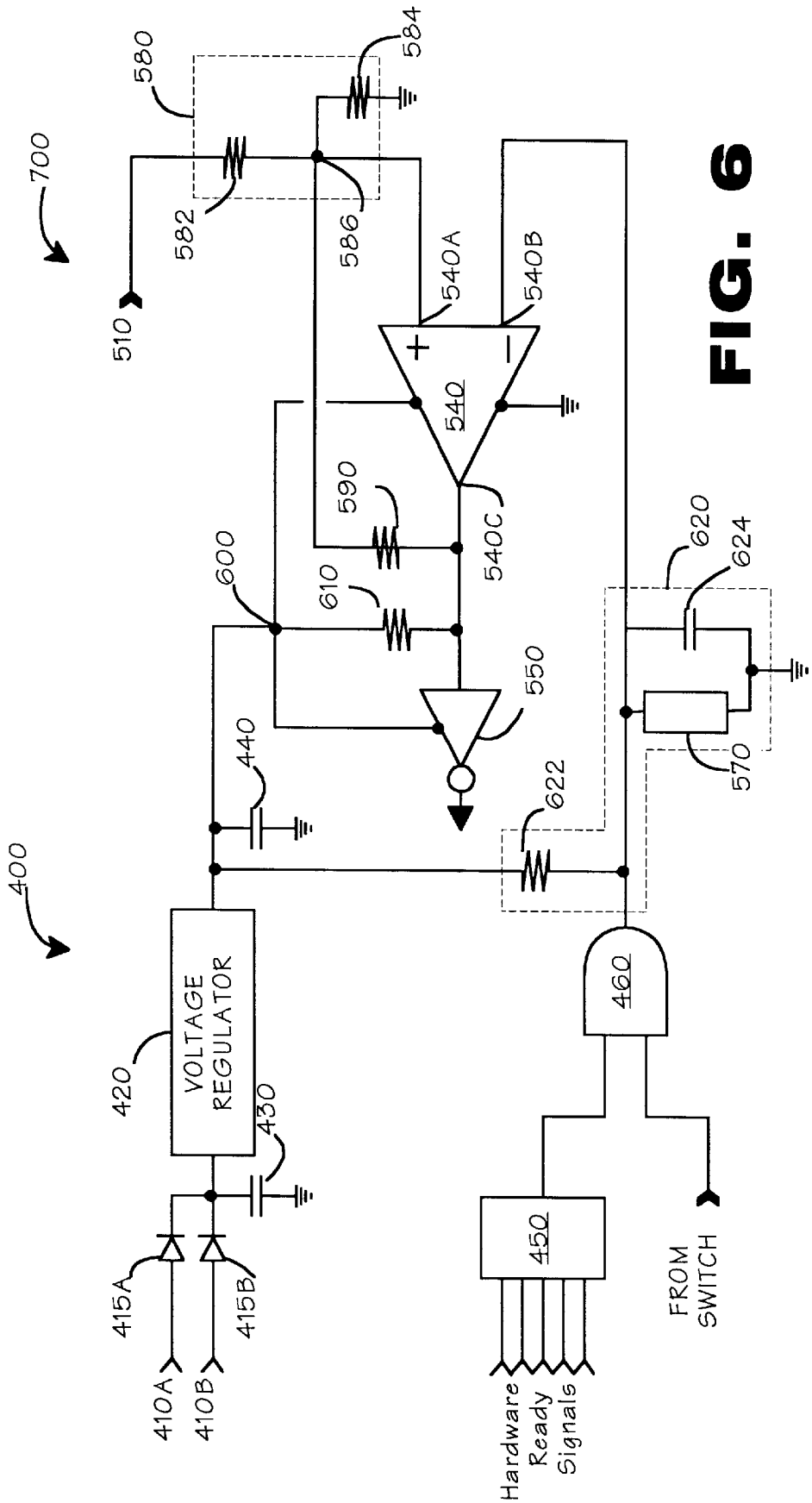
FIG. 6 is a circuit diagram illustrating an embodiment of a regulator circuit biased by a standby regulated voltage generator.

An embodiment of the one regulator circuit 500 biased by the standby regulated voltage and an embodiment of standby regulated voltage generator 400 are interconnected as shown in FIG. 6. There, the standby unregulated voltages are input at terminals 410A, 410B, merged via isolating devices 415A, 415B and input to a linear voltage regulator 420. The linear voltage regulator 420 generates the standby regulated voltage at a known level, typically +5 volts. The linear voltage regulator 420 may be an integrated circuit, model no. MC7805 available from Motorola, Inc. of Schaumburg, Ill. In the illustrated embodiment, shunt capacitors 430, 440 are provided on the input and output of the linear voltage regulator 420 to eliminate noise and to improve stability.

The standby regulated voltage biases the reference device 570 of regulator circuit 500D via resistor 622. The reference device 570 may be coupled to an open collector AND gate 460 that disables the reference device 570 in response to certain system failures. For example, a first input of the AND gate 460 may be a signal indicating the status of a power switch on a chassis of the electronic device (switch not shown). If switched to "off," the AND gate 460 disables the reference device 570 (and, because of the interconnected nature of the bias voltages, all other regulator circuits in the system).

A second input to the AND gate 460 may be an aggregate hardware ready signal, derived from the individual hardware ready signals from the various stages of the power supplies 100A, 100B (FIG. 3). The hardware ready signals from the power supplies are input to a sub-circuit 450. The sub-circuit 450 outputs the aggregate hardware ready signal to AND gate 460.

The sub-circuit 450 is a hardware device that may be preprogrammed based on how many operable power supplies are required to power each of the loads 300A–D. If the number of power supplies that are operating meets or exceeds the minimum number, the sub-circuit 450 outputs the aggregate hardware ready signal as high. If not, the hardware ready signal goes low, disabling the AND gate 460. In the simplest form, where there are only two power supplies 100A and 100B both of which are required to power the electronic device, the sub-circuit 450 simply may be an AND gate (not shown). If more than two power supplies are provided, the sub-circuit provides an adder and a digital comparator in series to generate the hardware ready signal (also not shown).

Those familiar with power distribution systems recognize that such systems typically provide point of use planes for each regulated voltage used in the device. The point of use planes typically provide bulk capacitors that drive the load at the regulated voltage. They may be coupled to the power supplies via the isolating devices at a docking backplane. To integrate the present invention into such systems, the regulator circuit of each regulated voltage may be provided within the associated point of use plane. Also, the standby regulated voltage generator 400 may be provided in the docking backplane.

As described, the present invention provides a digital control system for power supplies in electronic devices. The present invention has been described in the context of a two power supply system. However, the principles of the present invention apply uniformly to systems that provide two or more power supplies.

Several embodiments of the present invention are specifically illustrated and described herein. However, it will be appreciated that modifications and variations of the present invention are covered by the above teachings and within the preview of the appended claims without departing from the spirit and intended scope of the invention.

I claim:

1. A control system for a power distribution system, comprising:

a plurality of power supplies having controllable voltage outputs, jointly supplying power at a plurality of regulated voltages, and a plurality of regulator circuits, one associated with each regulated voltage, each regulator circuit receiving as inputs the associated jointly supplied regulated voltage and a reference voltage, and providing an output representative of a deviation of the associated jointly supplied regulated voltage from the reference voltage, the output coupled as a control input to each of the plurality of power supplies, the regulated voltage of a first regulator circuit being input as the reference voltage of a second regulator circuit.

2. The control system of claim 1, further comprising a reference voltage device coupled to first regulator circuit as the reference voltage.

3. A power distribution system, comprising:

at least two power supplies to generate power at a plurality of regulated voltages, the power supplies each having outputs at each regulated voltage, the outputs of the power supplies at each regulated voltage being coupled, a regulator circuit for each regulated voltage, each regulator circuits having a first input for its associated regulated voltage and a second input for a reference voltage, wherein, for all but one of the regulated voltages, the regulated voltage is input as the reference voltage to a regulator circuit of another regulated voltage.

4. The power distribution system of claim 3, wherein at least one regulator circuit comprises a pulse width modulator.

5. The power distribution system of claim 3, wherein at least one regulator circuit comprises a differential amplifier.

6. The power distribution system of claim 3, further comprising a standby voltage generator coupled to a reference voltage input of at least one regulator circuit.

* * * * *

UNITED STATES PATENT AND TRADEMARK OFFICE
CERTIFICATE OF CORRECTION

PATENT NO. : 5,952,733
DATED : JOHNSTON, Geron Mark
INVENTOR(S) : September 14, 1999

It is certified that error appears in the above-indentified patent and that said Letters Patent is hereby corrected as shown below:

Abstract

Page 1, line 3, after "by" insert --a--.

| Column | Line |
|---|---|
| 4 | line 51, delete "arid" and insert --and--. |
| 5 | line 54, before "divide" insert --to--. |
| 6 | line 15, after "input" insert --to--. |

| Claim | Column | Line |
|---|---|---|
| 3 | 8 | line 52, delete "circuits" and insert --circuit--. |

Signed and Sealed this

Seventeenth Day of April, 2001

Attest:

NICHOLAS P. GODICI

*Attesting Officer*    Acting Director of the United States Patent and Trademark Office